United States Patent
Kuo et al.

(10) Patent No.: US 9,471,175 B2
(45) Date of Patent: Oct. 18, 2016

(54) TOUCH SENSING PANEL AND TOUCH SENSING CONTROL UNIT THEREOF

(71) Applicant: Chunghwa Picture Tubes, LTD., Taoyuan County (TW)

(72) Inventors: De-Wei Kuo, Taipei (TW); Jhen-Shen Liao, Taoyuan County (TW); Hung-Hsiang Chen, Taoyuan County (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 126 days.

(21) Appl. No.: 14/497,348

(22) Filed: Sep. 26, 2014

(65) Prior Publication Data

US 2016/0018915 A1    Jan. 21, 2016

(30) Foreign Application Priority Data

Jul. 18, 2014   (TW) .............................. 103124774 A

(51) Int. Cl.
  *G06F 3/041*   (2006.01)
  *G06F 3/044*   (2006.01)
  *G06F 3/0346*  (2013.01)

(52) U.S. Cl.
  CPC ........... *G06F 3/0416* (2013.01); *G06F 3/0346* (2013.01); *G06F 3/044* (2013.01); *G06F 2203/04108* (2013.01); *G06F 2203/04111* (2013.01)

(58) Field of Classification Search
  CPC .... G06F 3/0416; G06F 3/044; G06F 3/0346; G06F 2203/04108; G06F 2203/04111
  USPC ...................... 178/18.01–19.07; 345/173–178
  See application file for complete search history.

(56) References Cited

U.S. PATENT DOCUMENTS

| | | | |
|---|---|---|---|
| 7,038,659 B2 | 5/2006 | Rajkowski | |
| 2012/0169400 A1 | 7/2012 | Liu | |
| 2012/0206269 A1 | 8/2012 | Wickman et al. | |
| 2014/0098058 A1 | 4/2014 | Baharav et al. | |
| 2014/0168138 A1* | 6/2014 | Kuo ...................... | G06F 3/0412 345/174 |
| 2015/0042908 A1* | 2/2015 | Wang ...................... | G06F 3/044 349/12 |

FOREIGN PATENT DOCUMENTS

| | | |
|---|---|---|
| CN | 203588221 | 5/2014 |
| JP | H05160702 | 6/1993 |
| TW | I390437 | 3/2013 |
| TW | 201423537 | 6/2014 |

OTHER PUBLICATIONS

"Office Action of Taiwan Counterpart Application", issued on Nov. 17, 2015, p. 1-p. 7.

* cited by examiner

*Primary Examiner* — Michael Pervan
(74) *Attorney, Agent, or Firm* — Jianq Chyun IP Office

(57) ABSTRACT

A touch sensing panel including a substrate, an electrode array, and a plurality of third electrodes is provided. The substrate has an active area and a peripheral area. The electrode array is located at the active area and includes a plurality of first electrodes and a plurality of second electrodes, wherein the second electrodes and the first electrodes are electrically insulated to each other and intersected with each other. The third electrodes area located at different sides of the peripheral area, respectively, and electrically insulated to the electrode array. A touch sensing control unit applied to the touch sensing panel is also provided.

10 Claims, 12 Drawing Sheets

TOUCH SENSING PANEL AND TOUCH SENSING CONTROL UNIT THEREOF

CROSS-REFERENCE TO RELATED APPLICATION

This application claims the priority benefit of Taiwan application serial no. 103124774, filed on Jul. 18, 2014. The entirety of the above-mentioned patent application is hereby incorporated by reference herein and made a part of this specification.

BACKGROUND

1. Field of the Invention

The invention relates to a touch sensing panel and a touch sensing control unit thereof.

2. Description of Related Art

Contact mode electronic products are very popular among customers and have gradually become the main trend in the market due to its easy operation and high intuition. However, as electronic products provide more and more functions, an operation mode which allows a direct touch on a screen (hereinafter referred to as two-dimensional touch) gradually fails to meet operating needs of users. In recent years, a variety of non-contact mode electronic products have developed for users to operate non-contact mode electronic products in the air (hereinafter referred to as three-dimensional touch) through additional cameras, microphones, or other touch sensing devices.

Since non-contact mode electronic products require additional touch sensing devices to carry out a remote control function, issues such as high costs and high power consumption occur. Besides, the non-contact mode electronic products do not provide the two-dimensional touch function. As demands for the two-dimensional touch and three-dimensional touch increase, electronic products are required to provide functions containing both two-dimensional touch and three-dimensional touch to enhance user convenience and intuition in operation.

SUMMARY OF THE INVENTION

The invention provides a touch sensing panel, which contains both a two-dimensional touch sensing function and a three-dimensional touch sensing function.

The invention provides a touch sensing control unit applied to the touch sensing panel, such that the touch sensing panel may carry out a two-dimensional touch sensing function and a three-dimensional touch sensing function.

A touch sensing panel of the invention includes a substrate, an electrode array, and a plurality of third electrodes. The substrate has an active area and a peripheral area. The electrode array is located at the active area and includes a plurality of first electrodes and a plurality of second electrodes, wherein the second electrodes and the first electrodes are electrically insulated to each other and intersected with each other. The third electrodes are located at different sides of the peripheral area respectively, and are electrically insulated to the electrode array.

The invention provides a touch sensing control unit, which is applied to the touch sensing panel and includes a drive control unit and a signal processing unit. The drive control unit includes a contact driving unit, a non-contact driving unit, and a selector. The contact driving unit is configured for providing a contact driving signal to each of contact driving electrodes. The non-contact driving unit is configured for providing a non-contact driving signal to the non-contact driving electrode. The selector is coupled to the contact driving unit and the non-contact driving unit. The drive control unit outputs the contact driving signal or the non-contact driving signal according to a selection of the selector. The signal processing unit is configured for receiving signals from the contact sensing electrodes and the non-contact sensing electrodes, to determine a touch sensing information of a target.

The invention provides a touch sensing control unit which is applied to the touch sensing panel and includes a drive control unit and a signal processing unit. The drive control unit includes a contact driving unit and a non-contact driving unit. The contact driving unit is configured for providing a contact driving signal to each of contact driving electrodes. The non-contact driving unit is configured for providing a non-contact driving signal to the non-contact driving electrode. The signal processing unit is configured for receiving signals from the contact sensing electrodes and the non-contact sensing electrodes, to determine a touch sensing information of a target.

In light of the foregoing, the above embodiments of the invention integrate the third electrodes configured for a three-dimensional touch sensing with a contact mode touch sensing panel, and the touch sensing control unit of the touch sensing panel is accordingly designed. Accordingly, the touch sensing panel illustrated in the above embodiments of the invention may contain both the two-dimensional touch sensing function and the three-dimensional touch sensing function.

Several exemplary embodiments accompanied with figures are described in detail below to further describe the invention in details.

DESCRIPTION OF EMBODIMENTS

Figure 1A:
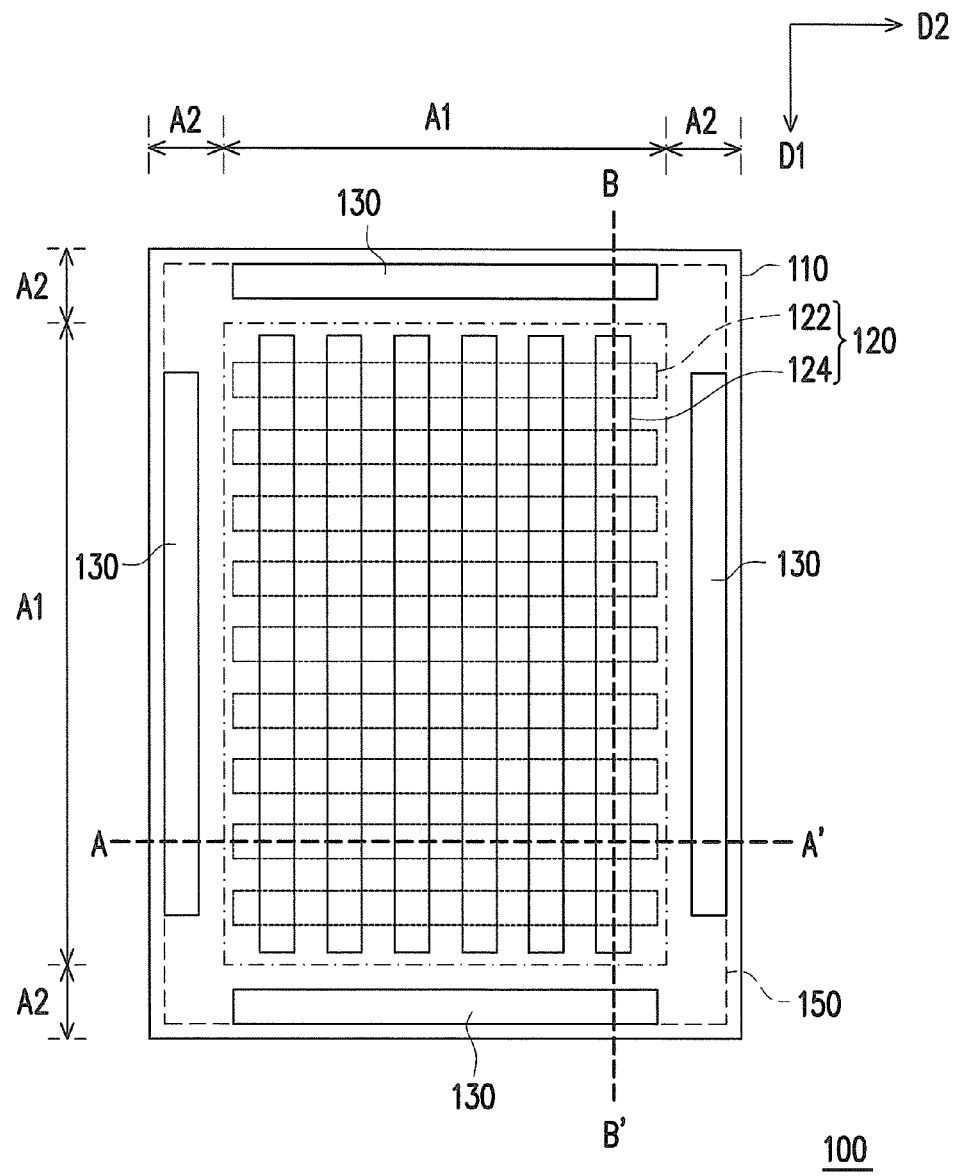
FIG. 1A is a top view illustrating a touch sensing panel according to the first embodiment of the invention.
Figure 1B:
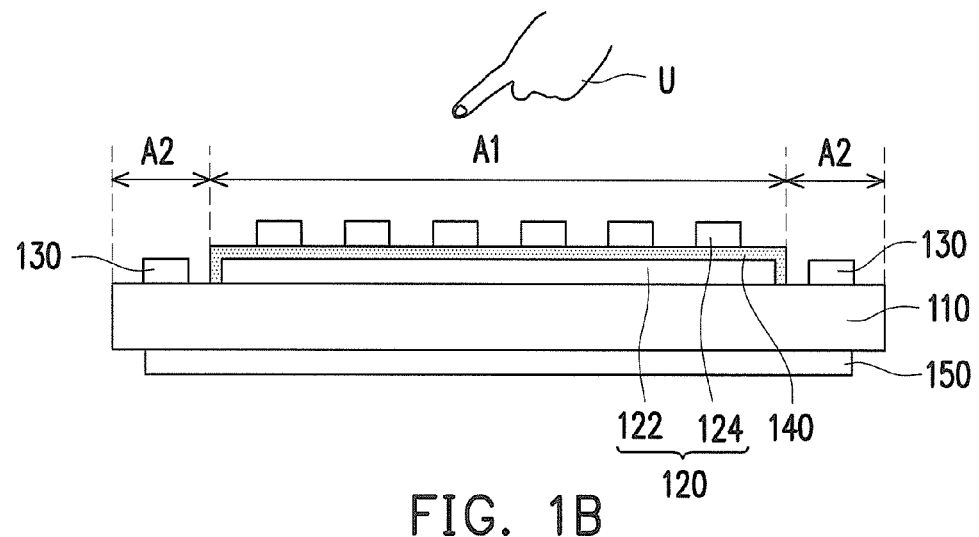
FIG. 1B and FIG. 1C are cross-sectional views along the line A-A' and the line B-B' depicted in FIG. 1A respectively.
Figure 1C:
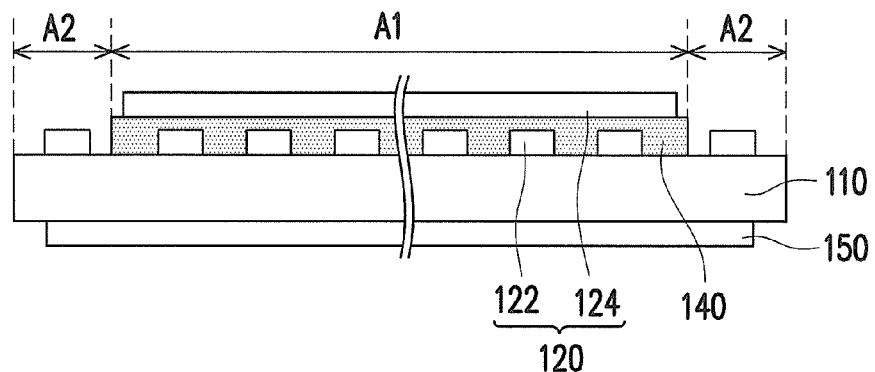
Figure 1D:
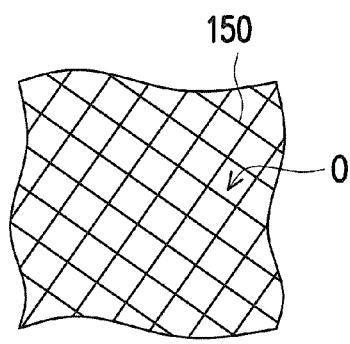
FIG. 1D is a partial top view illustrating the fourth electrode depicted in FIG. 1A.

FIG. 1A is a top view illustrating a touch sensing panel according to the first embodiment of the invention. FIG. 1B and FIG. 1C are cross-sectional views along the line A-A' and the line B-B' depicted in FIG. 1A respectively. FIG. 1D is a partial top view illustrating the fourth electrode depicted in FIG. 1A. With reference to FIG. 1A to FIG. 1D, a touch sensing panel 100 of the present embodiment includes a substrate 110, an electrode array 120, and a plurality of third electrodes 130.

The substrate 110 may be a device substrate in a display panel or a cover lens which is disposed at an exterior of the display panel. The device substrate, for example, is an opposite substrate of a liquid crystal display (LCD) panel, a package cover lens of an organic light emitting diode (LED) display panel, and so on, but is not limited thereto. The substrate 110 has an active area A1 and a peripheral area A2. The peripheral area A2 is at least located at one side of the active area A1, and the peripheral area A2, for example, surrounds the active area A1, but the invention is not limited thereto.

The electrode array 120 is located at the active area A1 and includes a plurality of first electrodes 122 and a plurality of second electrodes 124, wherein the second electrodes 124 and the first electrodes 122 are electrically insulated to each other and intersected with each other. In particular, in the present embodiment, each of the first electrodes 122 and each of the second electrodes 124, for example, are strip electrodes respectively, wherein the first electrodes 122 are arranged along a first direction D1, and extend along a second direction D2 respectively. The second electrodes 124 are arranged along the second direction D2, and extend along the first direction D1 respectively. The first direction D1 intersects with the second direction D2, and the first direction D1 and the second direction D2, for example, are perpendicular to each other, but the invention is not limited thereto.

The first electrodes 122 and the second electrodes 124 are disposed on the same surface of the substrate 110. To avoid short circuits caused by contacts between the first electrodes 122 and the second electrodes 124, the touch sensing panel 100 may further be provided with an insulating layer 140 between the first electrodes 122 and the second electrodes 124, to separate the first electrodes 122 and the second electrodes 124. In the present embodiment, the insulating layer 140, for example, is a continuous insulating thin film, which covers the active area A1 and exposes the peripheral area A2. In addition, the insulating layer 140 is disposed between the first electrodes 122 and the second electrodes 124, such that the first electrodes 122 and the second electrodes 124 are electrically insulated to each other through the insulating layer 140.

More specifically, the first electrodes 122 are disposed on the substrate 110. The insulating layer 140 covers the first electrodes 122 and the substrate 110 which is exposed by the first electrodes 122 in the active area A1, and provides the second electrodes 124 with a flat carrier surface. The second electrodes 124 are disposed on the insulating layer 140. However, the invention is not limited thereto. Types of the insulating layer 140 or covering scopes thereof is not limited to those illustrated in FIG. 1A. In another embodiment, the insulating layer 140 may further cover the peripheral area A2. Alternatively, the insulating layer 140 may also be a plurality of island-shaped insulating patterns which are isolated from each other, and the insulating patterns are disposed at intersections of the first electrodes 122 and the second electrodes 124.

The third electrodes 130 are electrically insulated to the electrode array 120. Besides, the third electrodes and the electrode array 120 are disposed on the same side of the substrate 110, for example. As shown in FIG. 1A, the third electrodes 130 are located at different sides of the peripheral area A2 respectively. Besides, the third electrodes are disposed adjacent to four sides of the substrate 110 respectively, for example, such that the electrode array 120 is located inside an area surrounded by the third electrodes 130, but the invention is not limited thereto. For example, the third electrodes 130 may also be disposed at four corners of the substrate 110. Alternatively, the third electrodes 130 may also be disposed at opposite sides or opposite angles of the substrate 110.

The third electrodes 130 and the electrode array 120 may adopt similar or the same materials, and the third electrodes 130 and the first electrodes 122 or the second electrodes 124 may be fabricated by the same process. For example, the materials for the electrode array 120 and the third electrodes 130 are transparent conductive materials respectively, such as metal oxide, but the invention is not limited thereto. The metal oxide includes indium tin oxide (ITO), indium zinc oxide (IZO), aluminum tin oxide (ATO), aluminum zinc oxide (AZO), or indium germanium zinc oxide (IGZO), but the invention is not limited thereto.

The touch sensing panel 100 may further include a fourth electrode 150. The fourth electrode 150 is at least located at the active area A1, and further extends to the peripheral area A2, for example, such that sidewalls of the fourth electrode 150 are aligned with sidewalls of the third electrodes 130. In other words, an orthogonal projection of the fourth electrode 150 on the substrate 110 is overlapped with orthogonal projections of the first electrodes 122, the second electrodes 124, and the third electrodes 130 on the substrate 110, but the invention is not limited thereto. Since an area of the fourth electrode 150 is approximate to an area of the substrate 110, the fourth electrode 150 of the present embodiment is disposed on one side of the substrate 110 opposite to the electrode array 120 and the third electrodes 130, such that the electrode array 120, the third electrodes 130, and the fourth electrode 150 are electrically independent. In another embodiment, the area of the fourth electrode 150 may also be smaller than or equal to an area of the active area A1, such that the orthogonal projection of the fourth electrode 150 on the substrate 110 is not overlapped with the orthogonal projection of the third electrodes 130 on the substrate 110. Accordingly, when the fourth electrode 150 and the third electrodes 130 are located on the same surface, there is no need to concern about short circuits caused by contacts between the fourth electrode 150 and the third electrodes 130. Thus, the fourth electrode 150 and the third electrodes 130 may be located at one side of the substrate 110 opposite to the electrode array 120. Alternatively, the third electrodes 130 and the electrode array 120 may be located at the same side of the substrate 110, while the fourth electrode 150 is located at one side of the substrate 110 opposite to the third electrodes 130 and the electrode array 120.

A material of the fourth electrode 150 may also be the transparent conductive material, and a type thereof, as shown in FIG. 1D, may be a mesh electrode which is formed by a plurality of electrodes intersected with each other, wherein a line width of the mesh electrode and a size of an opening O may be determined based on requirements of actual designs. Besides, in addition to a quadrangle, a shape of the opening O may also be other polygons.

After a fabrication of the fourth electrode 150 is completed, a subsequent fabricating process of a display panel may be continued on a surface of the substrate 110 where the fourth electrode 150 are formed, to form a touch display panel. Alternatively, the touch sensing panel 100 and the display panel may also be bonded through an adhesive layer which is not shown in the invention.

The touch sensing panel 100 includes a contact mode and a non-contact mode, which are configured for determining touch sensing information of a target U (e.g., a touch sensing coordinate or a moving information of the target U) respectively, when the target U (e.g., a finger of a user, a stylus, or other conductive objects) performs a two-dimensional touch sensing or a three-dimensional touch sensing. In the present embodiment, the electrode array 120, for example, is an electrode configured for the two-dimensional touch sensing, while the third electrodes 130 and the fourth electrode 150, for example, are electrodes configured for the three-dimensional touch sensing. In other words, the electrode configured for the two-dimensional touch sensing and the electrodes configured for the three-dimensional touch sensing are disposed independently from each other.

In the contact mode, one of the first electrodes 122 and the second electrodes 124 are contact driving electrodes, while the other one of the first electrodes 122 and the second electrodes 124 are contact sensing electrodes. In the present embodiment, the second electrodes 124 which are closer to the target U, for example, are the contact sensing electrodes, while the first electrodes 122 which are farther away from the target U are the contact driving electrodes, but the invention is not limited thereto. In another embodiment, the second electrodes 124 may also be the contact driving electrodes, while the first electrodes 122 may also be the contact sensing electrodes. In the non-contact mode, the fourth electrode 150 is a non-contact driving electrode, while the third electrodes 130 are non-contact sensing electrodes.

Figure 2:
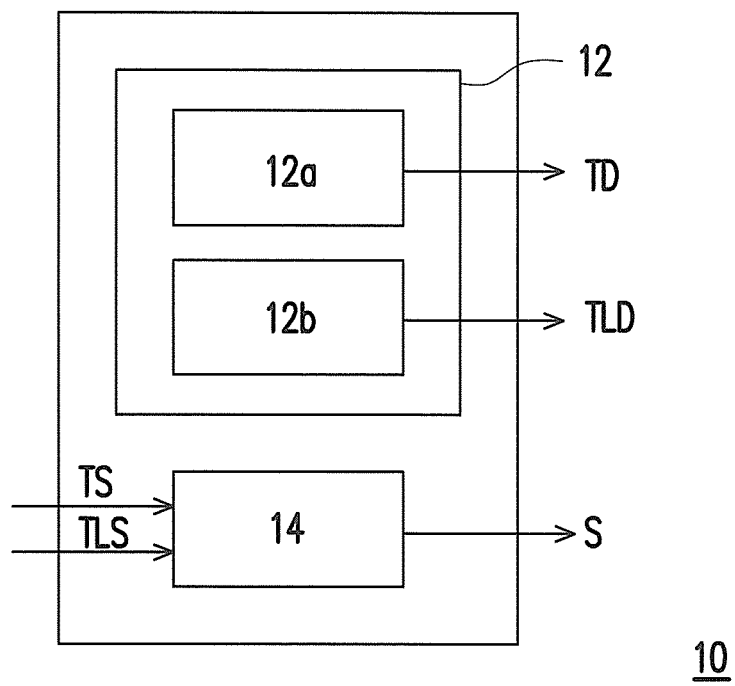
FIG. 2 is a schematic view illustrating a touch sensing control unit which is applied to the touch sensing panel depicted in FIG. 1A.

The method for the touch sensing panel 100 to determine touch sensing information is described below with reference to FIG. 2. FIG. 2 is a schematic view illustrating a touch sensing control unit which is applied to the touch sensing panel depicted in FIG. 1A. With reference to FIG. 1A, FIG. 1B, and FIG. 2, a touch sensing control unit 10 is electrically connected to the touch sensing panel 100 to transmit driving signals to the corresponding contact driving electrodes and the non-contact driving electrodes, and to receive signals from the contact sensing electrodes and the non-contact sensing electrodes, to determine the touch sensing information of the target U.

The touch sensing control unit 10 includes a drive control unit 12 and a signal processing unit 14. The drive control unit 12 includes a contact driving unit 12a and a non-contact driving unit 12b. The contact driving unit 12a is electrically connected to the contact driving electrodes to provide a contact driving signal TD to each of the contact driving electrodes. The non-contact driving unit 12b is electrically connected to the non-contact driving electrode to provide a non-contact driving signal TLD to the non-contact driving electrode. In the present embodiment, the driving electrodes configured for the two-dimensional touch sensing and the third-dimensional touch sensing are disposed independently from each other. Accordingly, the non-contact driving electrodes and the contact driving electrodes may be driven synchronically.

The signal processing unit 14 is electrically connected to the contact sensing electrodes and the non-contact sensing electrodes to receive signals TS and TLS from the contact sensing electrodes and the non-contact sensing electrodes. Thus, a touch sensing information S of the target U is determined, and that the touch sensing panel 100 executes functions corresponding to the touch sensing information S.

Specifically, in the contact mode, the contact driving electrodes (e.g., the first electrodes 122) are sequentially provided with the contact driving signals TD respectively, such that a fringe electric field is formed between the contact driving electrodes (e.g., the first electrodes 122) and the contact sensing electrodes (e.g., the second electrodes 124). When the target U contacts the electrode array 120, a fringe electric field of the electrode 120 corresponding to a touched area changes. The contact sensing electrodes receive the changed signals TS and transmit the signals TS to the signal processing unit 14, such that a touch sensing position of the target U may be detected.

Likewise, in the non-contact mode, the non-contact driving electrode (e.g., the fourth electrode 150) is provided with the non-contact driving signals TLD, such that a fringe electric field is formed between the non-contact driving electrode (e.g., the fourth electrode 150) and the non-contact sensing electrodes (e.g., the third electrodes 130). Here, a fringe electric field formed between electrodes configured for the three-dimensional touch sensing is greater than a fringe electric field formed between electrodes configured for the two-dimensional touch sensing, to ensure that when the target U approaches but has not touched the non-contact sensing electrodes, the non-contact sensing electrodes are capable of sensing variations of the fringe electric field between the electrodes configured for the three-dimensional touch sensing, and transmitting the changed signals TLS to the signal processing unit 14, in order for the signal processing unit 14 to determine movements or gestures of the target U.

In light of the foregoing, the present embodiment integrates the third electrodes 130 and the fourth electrode 150 configured for the three-dimensional touch sensing with the electrode array 120 configured for the two-dimensional touch sensing on the substrate 110, and accordingly designs the touch sensing control unit of the touch sensing panel 100. As such, the touch sensing panel 100 may contain the two-dimensional touch sensing function and the three-dimensional touch sensing function, and enhance operation convenience and intuition for a user.

Figure 3A:
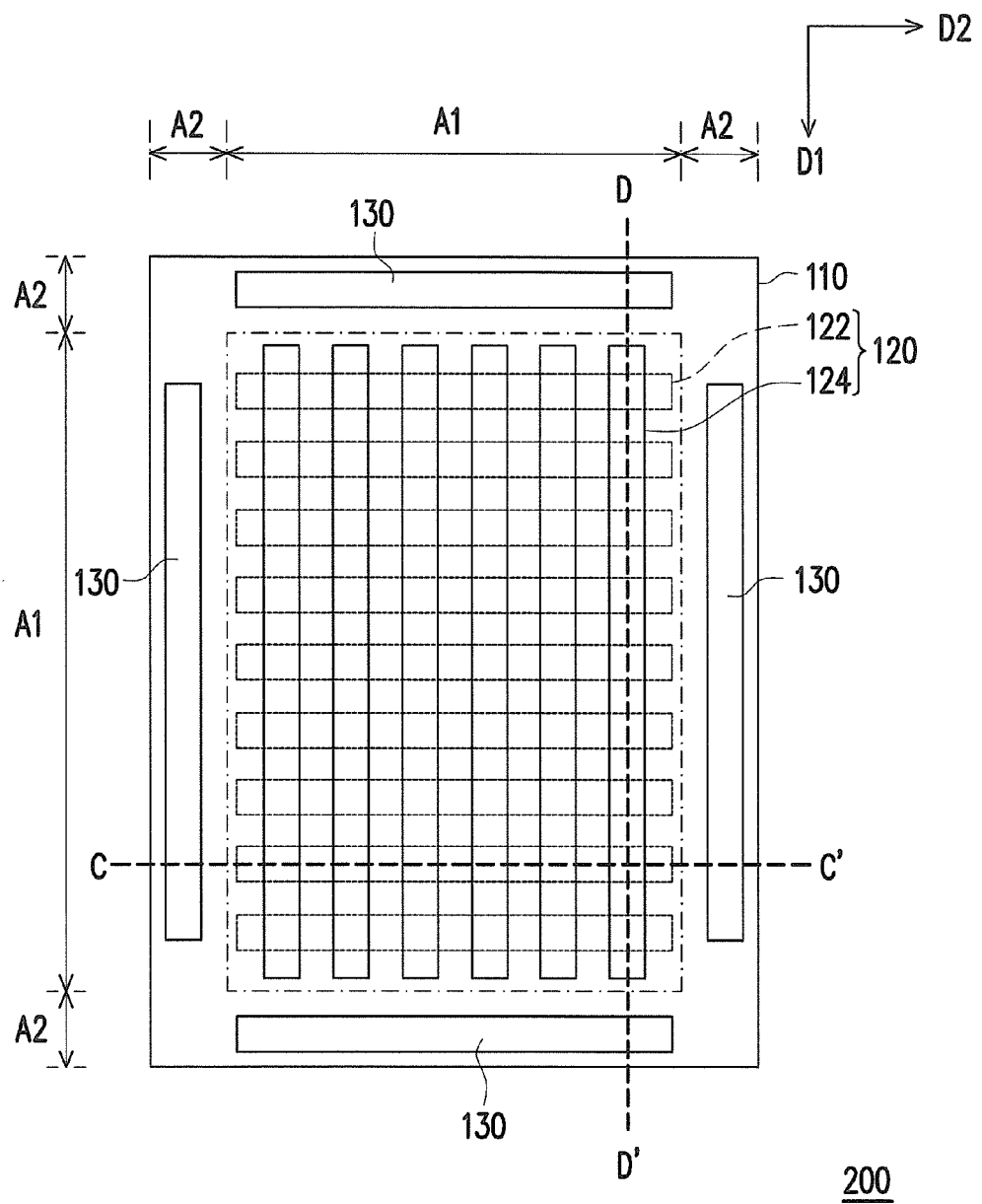
FIG. 3A is a top view illustrating a touch sensing panel according to the second embodiment of the invention.
Figure 3B:
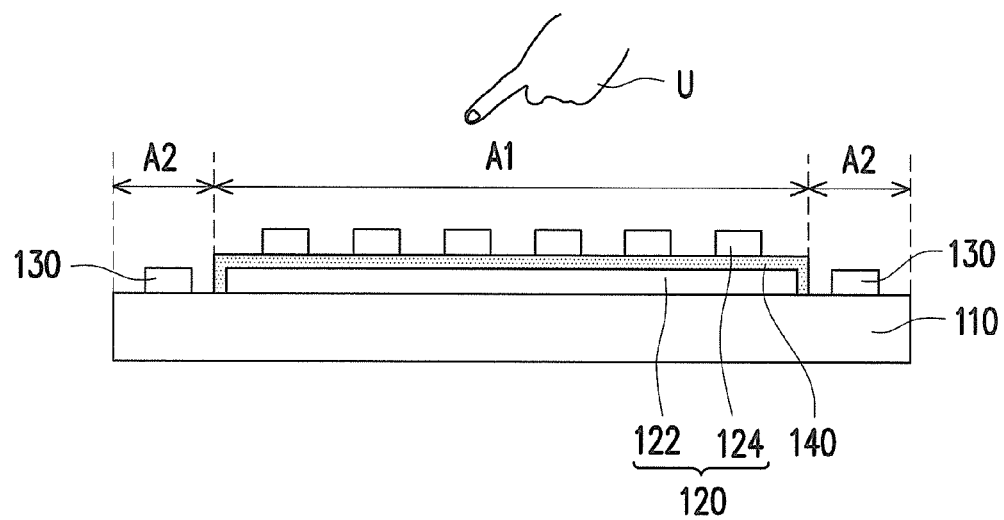
FIG. 3B and FIG. 3C are cross-sectional views along the line C-C' and the line D-D' depicted in FIG. 3A respectively.
Figure 3C:
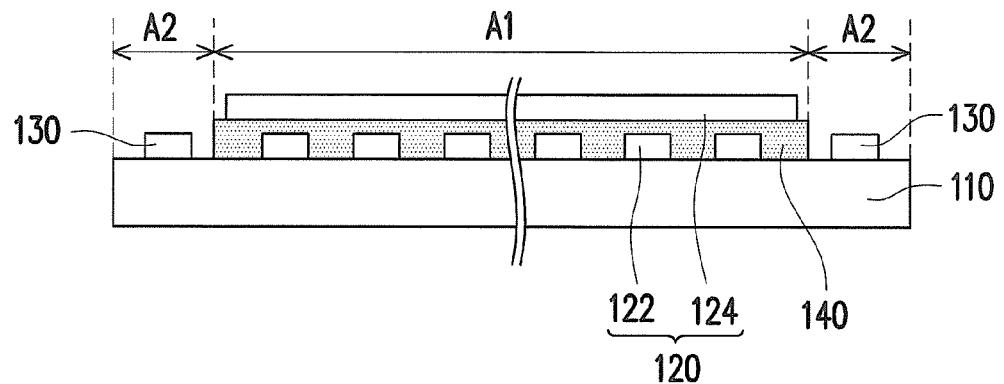
Figure 4:
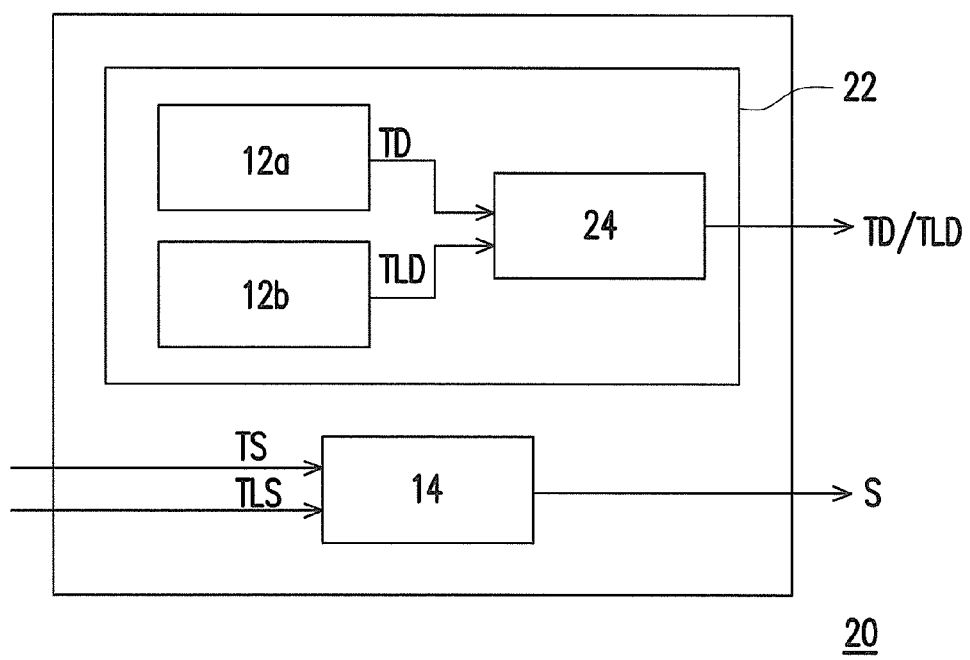
FIG. 4 is a schematic view illustrating a touch sensing control unit which is applied to the touch sensing panel depicted in FIG. 3A.

FIG. 3A is a top view illustrating a touch sensing panel according to the second embodiment of the invention. FIG. 3B and FIG. 3C are cross-sectional views along the line C-C' and the line D-D' depicted in FIG. 3A respectively. FIG. 4 is a schematic view illustrating a touch sensing control unit which is applied to the touch sensing panel depicted in FIG. 3A. With reference to FIG. 3A to FIG. 3C, a touch sensing panel 200 of the present embodiment is substantially the same as the touch sensing panel 100 depicted in FIG. 1A to FIG. 1C, and the same components are represented by the same reference numbers, which are not reiterated hereinafter. A primary difference between the touch sensing panel 200 and the touch sensing panel 100 lies in that the electrode array 120 of the present embodiment, in addition to be the electrode configured for the two-dimensional touch sensing, may further be the non-contact driving electrode in the non-contact mode. Accordingly, an arrangement of the fourth electrode 150 as the non-contact driving electrode in the touch sensing panel 100 is omitted in the present embodiment. Thus, the present embodiment has a relatively simplified process. Furthermore, since the non-contact driving electrodes of the present embodiment are not shielded by a conductive film layer, an issue of signals being shielded may be avoided, such that the touch sensing panel 200 also has excellent touch sensing sensitivity in the non-contact mode.

In the present embodiment, in addition to be the electrode configured for the two-dimensional touch sensing, the electrode array 120 may further be the non-contact driving electrode in the non-contact mode. In other words, the electrodes configured for the two-dimensional touch sensing and the third-dimensional touch sensing are not disposed independently. Accordingly, the non-contact driving electrodes and the contact driving electrodes should adopt a time-sharing driving. With reference to FIG. 4, a touch sensing control unit 20 applied to the touch sensing panel 200 is substantially the same as the touch sensing control unit 10 applied to the touch sensing panel 100, and the same components are represented by the same reference numbers, which are not reiterated hereinafter. A primary difference between the touch sensing control unit 20 and the touch sensing control unit 10 lies in that a drive control unit 22 further includes a selector 24, wherein the selector 24 is coupled to the contact driving unit 12a and the non-contact driving unit 12b, and the drive control unit 22 outputs the contact driving signals TD or the non-contact driving signals TLD according to a selection of the selector 24. In other words, at the same timing, the drive control unit 22 only outputs one of the contact driving signals TD and the non-contact driving signals TLD.

Figure 5A:
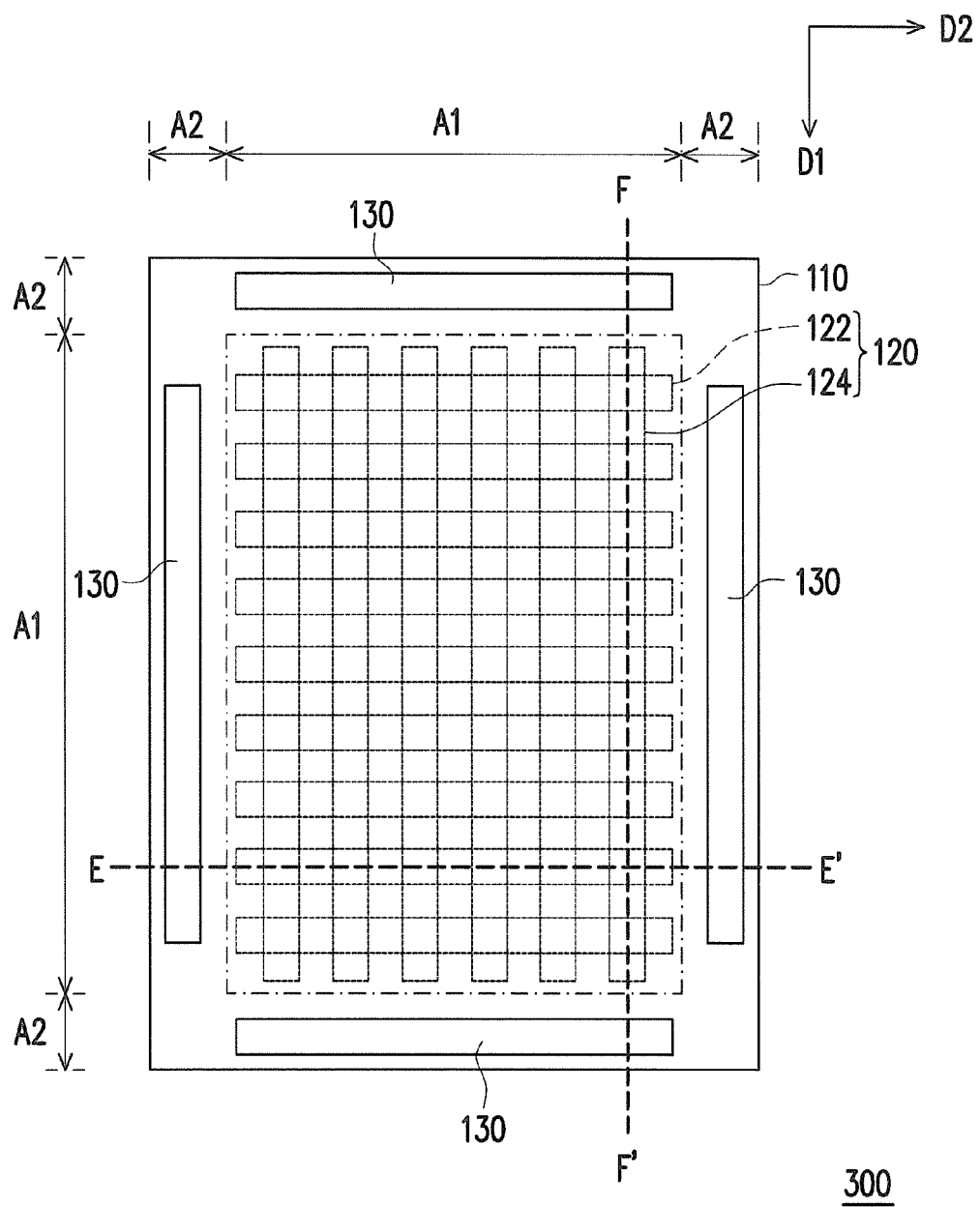
FIG. 5A is a top view illustrating a touch sensing panel according to the third embodiment of the invention.
Figure 5B:
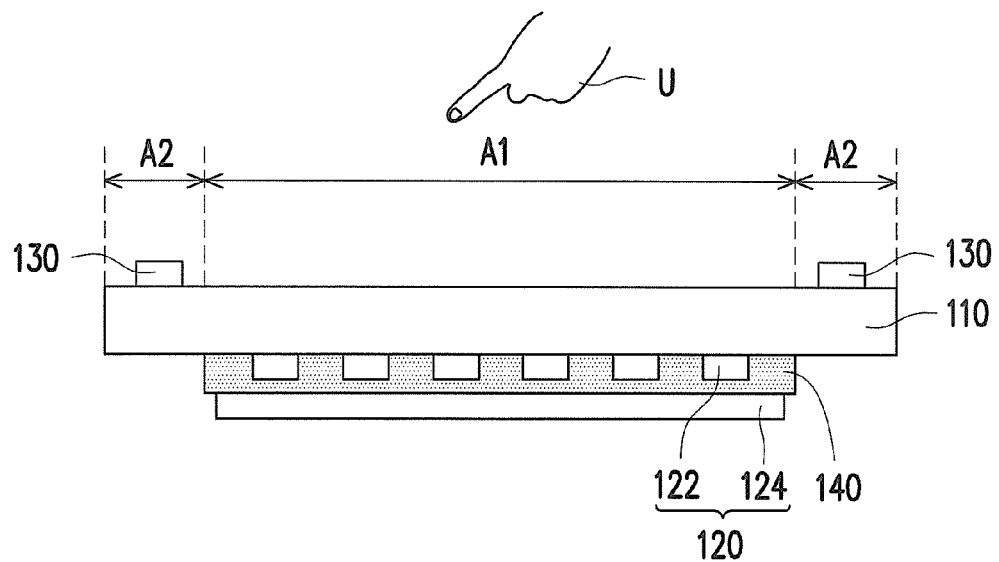
FIG. 5B and FIG. 5C are cross-sectional views along the line E-E' and the line F-F' depicted in FIG. 5A respectively.
Figure 5C:
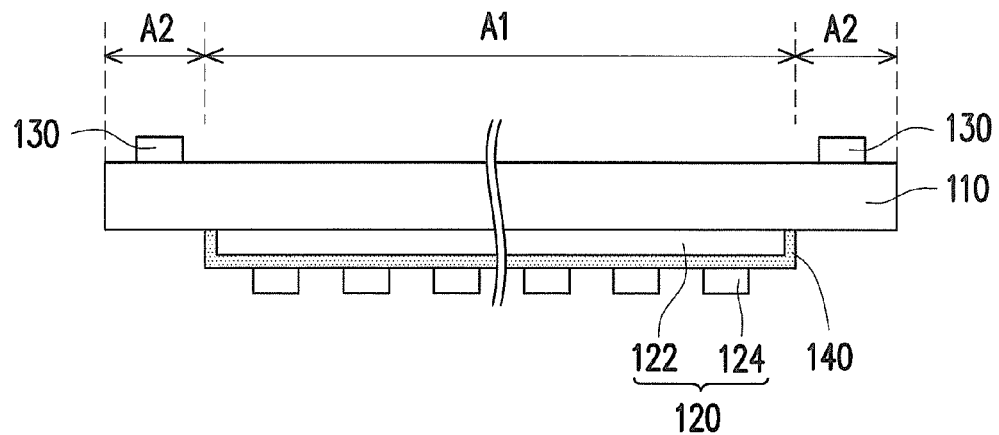

In the above embodiment, the electrode array 120 and the third electrodes 130 are disposed on the same side of the substrate 110, but the invention is not limited thereto. FIG. 5A is a top view illustrating a touch sensing panel according to the third embodiment of the invention. FIG. 5B and FIG. 5C are cross-sectional views along the line E-E' and the line F-F' depicted in FIG. 5A respectively. With reference to FIG. 5A to FIG. 5C, a touch sensing panel 300 of the present embodiment is substantially the same as the touch sensing panel 200 depicted in FIG. 3A to FIG. 3C, and the same components are represented by the same reference numbers, which are not reiterated hereinafter. A primary difference between the touch sensing panel 300 and the touch sensing panel 200 lies in that the electrode array 120 and the third electrodes 130 of the present embodiment are disposed on two opposite sides of the substrate 110, respectively. In the present embodiment, the first electrodes 122 are closer to the target U than the second electrodes 124. Accordingly, in the contact mode, the first electrodes 122, for example, are the contact sensing electrodes, while the second electrodes 124 are the contact driving electrodes. In other words, the first electrodes 122 are electrically connected to the contact driving unit 12a depicted in FIG. 4, while the second electrodes 124 are electrically connected to the signal processing unit 14.

Figure 6A:
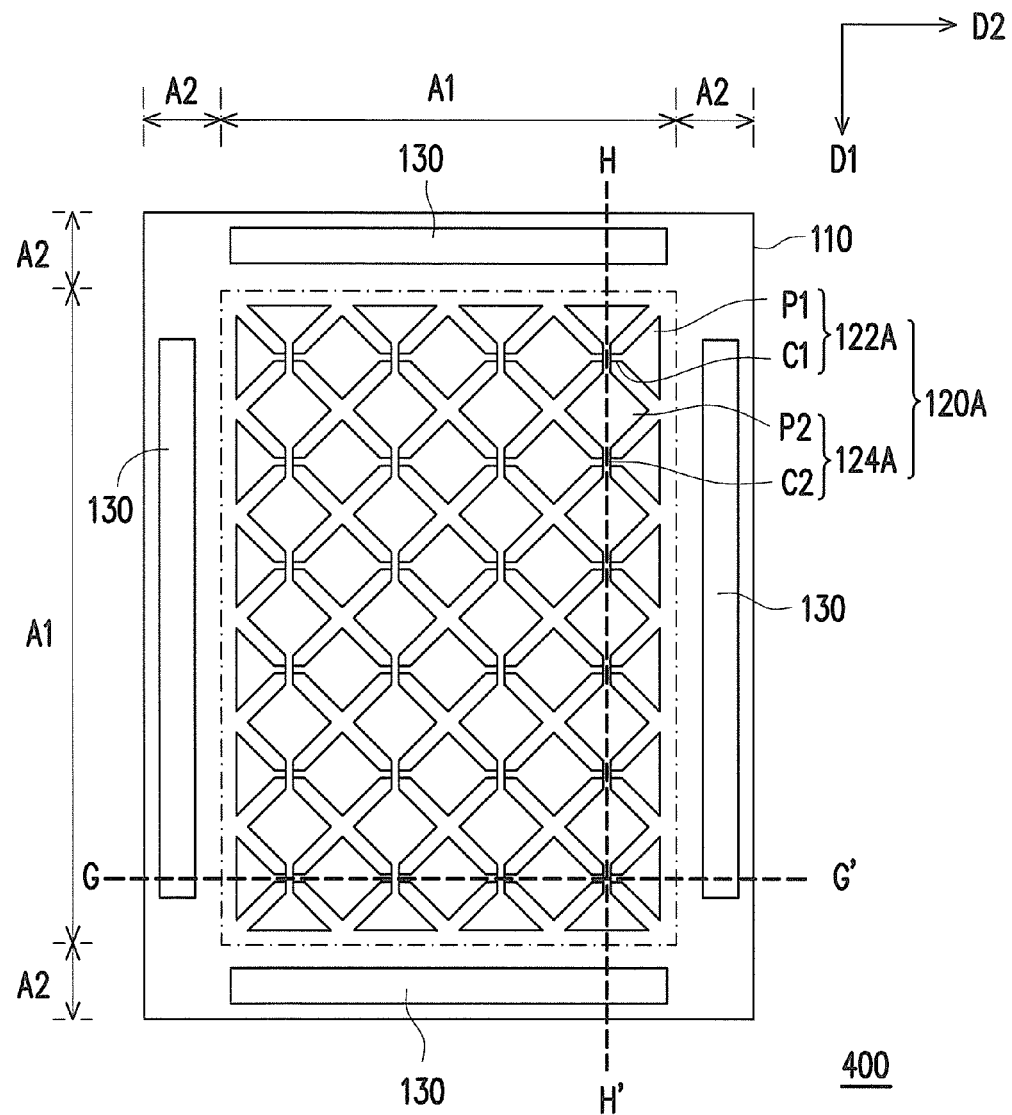
FIG. 6A is a top view illustrating a touch sensing panel according to the fourth embodiment of the invention.
Figure 6B:
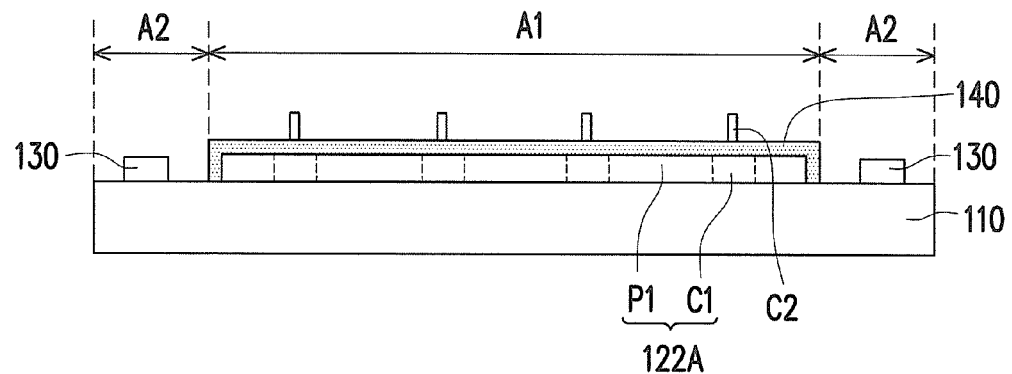
FIG. 6B and FIG. 6C are the first cross-sectional views along the line G-G' and the line H-H' depicted in FIG. 6A respectively.
Figure 6C:
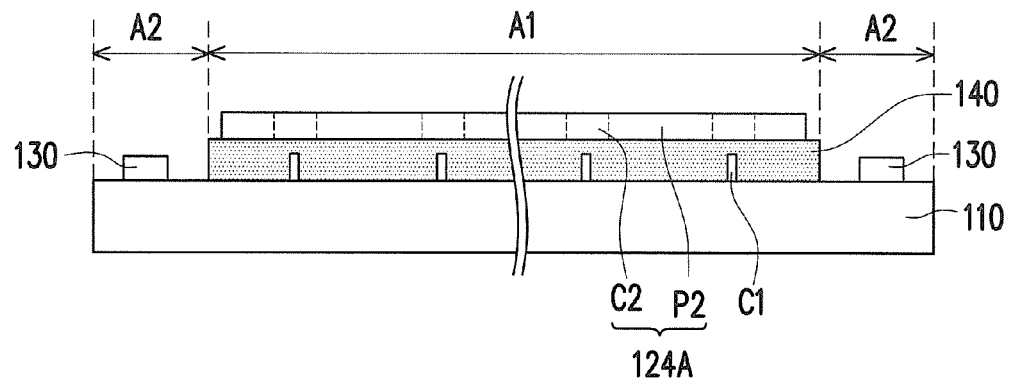

In the above embodiment, each of the first electrodes 122 and each of the second electrodes 124 are illustrated as strip electrodes, but the invention does not limit shapes of each of the first electrodes 122 and each of the second electrodes 124. FIG. 6A is a top view illustrating a touch sensing panel according to the fourth embodiment of the invention. FIG. 6B and FIG. 6C are the first cross-sectional views along the line G-G' and the line H-H' depicted in FIG. 6A respectively. With reference to FIG. 6A to FIG. 6C, a touch sensing panel 400 of the present embodiment is substantially the same as the touch sensing panel 200 depicted in FIG. 3A to FIG. 3C, and the same components are represented by the same reference numbers, which are not reiterated hereinafter. A primary difference between the touch sensing panel 400 and the touch sensing panel 200 lies in that each of first electrodes 122A of the present embodiment includes a plurality of first electrode pads P1 and a plurality of first connecting portions C1, wherein each of the first connecting portions C1 connects the two adjacent first electrode pads P1 in series along the second direction D2. In addition, each of the second electrodes 124A includes a plurality of second electrode pads P2 and a plurality of second connecting portions C2, wherein each of the second connecting portions C2 connects the two adjacent second electrode pads P2 in series along the first direction D1.

The first electrodes 122A and the second electrodes 124A intersect with the first connecting portions C1 and the second connecting portions C2, and the first electrodes 122A and the second electrodes 124A are electrically insulated to each other through the insulating layer 140. In the present embodiment, the first electrodes 122A and the second electrodes 124A are disposed on two opposite sides of the insulating layer 140 respectively. Specifically, the first electrodes 122A are disposed on the substrate 110. The insulating layer 140 covers the first electrodes 122A and the substrate 100 exposed by the first electrodes 122A in the active area A1, and provides the second electrodes 124A with a flat carrier surface. The second electrodes 124A are disposed on the insulating layer 140. However, types of the insulating layer 140, or relative arrangement relations among the insulating layer 140, the first electrodes 122A and the second electrodes 124A are not limited in FIG. 6B and FIG. 6C. Other types of relative arrangement relations among the insulating layer 140, the first electrodes 122A and the second electrodes 124A are further described with reference to the following FIG. 7A to FIG. 8B.

Figure 7A:
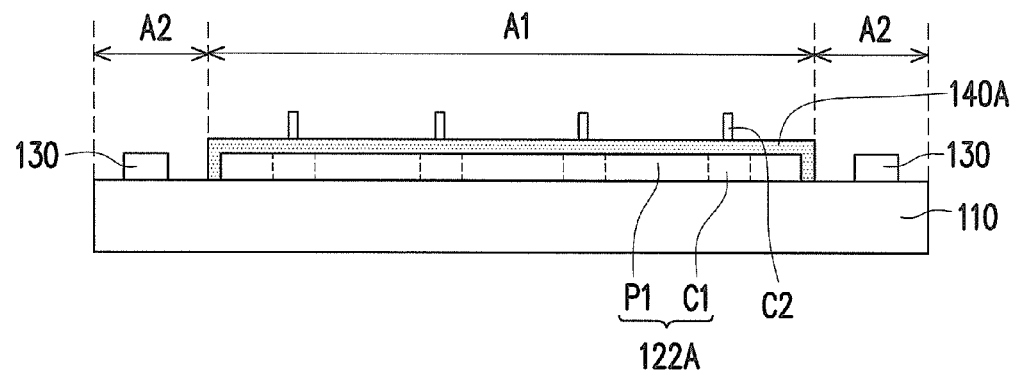
FIG. 7A and FIG. 7B are the second cross-sectional views along the line G-G' and the line H-H' depicted in FIG. 6A respectively.
Figure 7B:
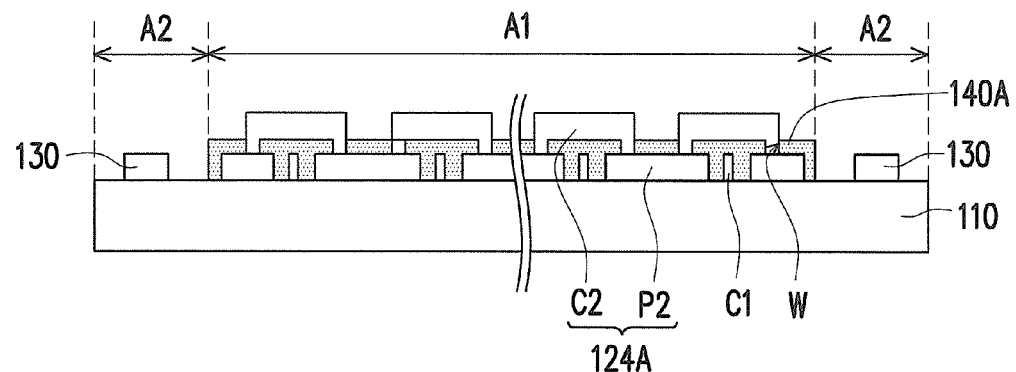

FIG. 7A and FIG. 7B are the second cross-sectional views along the line G-G' and the line H-H' depicted in FIG. 6A respectively. With reference to FIG. 7A and FIG. 7B, in the present embodiment, a relative arrangement relation among the insulating layer 140A, the first electrodes 122A, and the second electrodes 124A is substantially the same as the relative arrangement relation among the insulating layer 140, the first electrodes 122A, and the second electrodes 124A depicted in FIG. 6B and FIG. 6C. A primary difference lies in that the first electrodes 122A and the second electrode pads P2 of the present embodiment are all disposed on the substrate 110. The insulating layer 140A covers the first electrodes 122A, the second electrode pads P2, and the substrate 110 exposed by the first electrodes 122A and the second electrode pads P2 in the active area A1. In addition, the insulating layer 140A has a plurality of openings W, and each of the openings W exposes a partial area of the corresponding second electrode pads P2. The second connecting portions C2 are disposed on the insulating layer 140A, and contact with the corresponding second electrode pads P2.

Figure 8A:
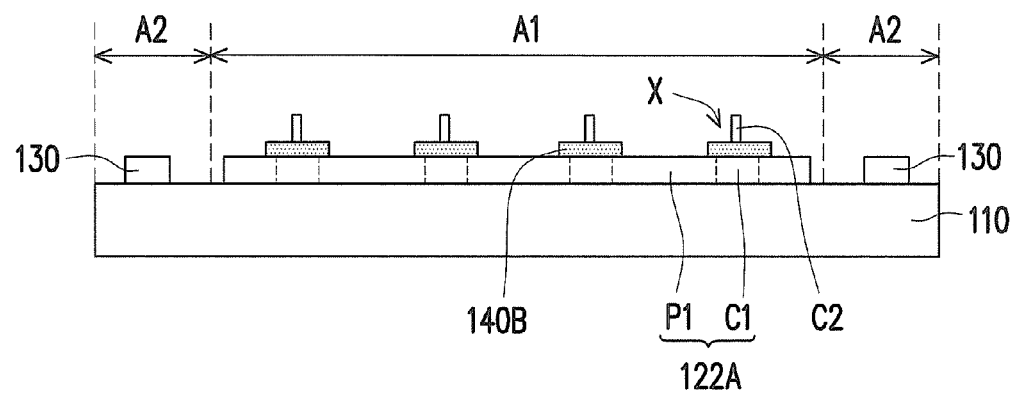
FIG. 8A and FIG. 8B are the third cross-sectional views along the line G-G' and the line H-H' depicted in FIG. 6A respectively.
Figure 8B:
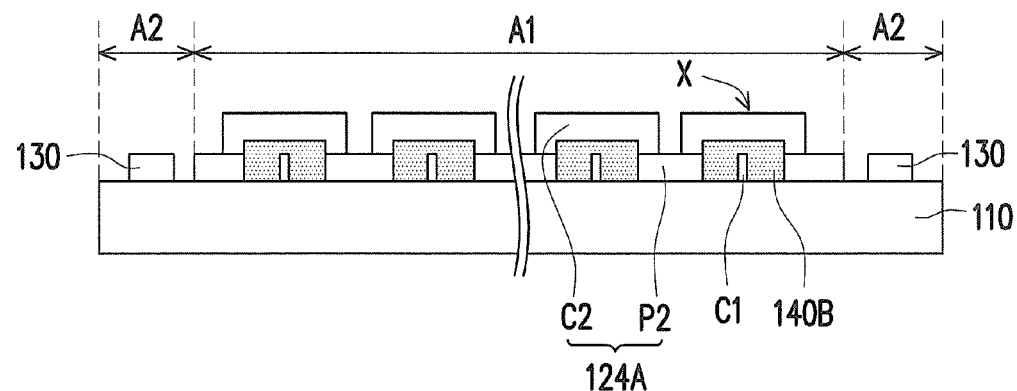

FIG. 8A and FIG. 8B are the third cross-sectional views along the line G-G' and the line H-H' depicted in FIG. 6A respectively. With reference to FIG. 8A and FIG. 8B, in the present embodiment, a relative arrangement relation among the insulating layer 140B, the first electrodes 122A, and the second electrodes 124A is substantially the same as the relative arrangement relation among the insulating layer 140A, the first electrodes 122A, and the second electrodes 124A depicted in FIG. 7B and FIG. 7C. A primary difference lies in that the insulating layers 140B of the present embodiment are a plurality of island-shaped insulating patterns which are disposed at intersections X of the first electrodes 122A and the second electrodes 124A. Specifically, the first electrode pads P1 and the second electrodes 124A are all disposed on the substrate 110. The insulating layers 140B cover the first electrodes 122A at the intersections X. For example, the insulating layers 140B cover the first connecting portions C1 and partial areas of the first electrode pads P1 connected to the first connecting portions C1. The second connecting portions C2 cross over the insulating layers 140B, and connect the adjacent first electrode pads P1 in series.

In summary, the above embodiments of the invention integrate the third electrodes configured for the three-dimensional touch sensing with a contact mode touch sensing panel, and the touch sensing control unit of the touch sensing panel is accordingly designed. Accordingly, the touch sensing panel illustrated in the above embodiments of the invention may contain both the two-dimensional touch sensing function and the three-dimensional touch sensing function.

Although the invention has been disclosed with reference to the aforesaid embodiments, they are not intended to limit the invention. It will be apparent to those skilled in the art that various modifications and variations can be made to the structure of the disclosed embodiments without departing from the scope or spirit of the invention. In view of the foregoing, it is intended that the disclosure cover modifications and variations of the specification provided they fall within the scope of the following claims and their equivalents.

What is claimed is:

1. A touch sensing panel, comprising:
    a substrate having an active area and a peripheral area;
    an electrode array located at the active area and comprising a plurality of first electrodes and a plurality of second electrodes, wherein the second electrodes and the first electrodes are electrically insulated to each other and intersected with each other;
    a plurality of third electrodes located at different sides of the peripheral area respectively, and electrically insulated to the electrode array; and
    a fourth electrode at least located at the active area, the fourth electrode electrically insulated to the electrode array and the third electrodes, and the fourth electrode and the electrode array disposed on two opposite sides of the substrate respectively, wherein the touch sensing panel comprises a contact mode and a non-contact mode, in the contact mode, one of the first electrodes and the second electrodes are contact driving electrodes, and the other one of the first electrodes and the second electrodes are contact sensing electrodes, in the non-contact mode, the fourth electrode is a non-contact driving electrode, and the third electrodes are non-contact sensing electrodes.

2. The touch sensing panel as claimed in claim 1, wherein the electrode array and the third electrodes are disposed on the same side of the substrate.

3. The touch sensing panel as claimed in claim 1, wherein the electrode array and the third electrodes are disposed on two opposite sides of the substrate respectively.

4. The touch sensing panel as claimed in claim 1, wherein the fourth electrode is disposed on one side of the substrate opposite to the electrode array and the third electrodes.

5. The touch sensing panel as claimed in claim 1, wherein the fourth electrode is a mesh electrode, and an orthogonal projection of the fourth electrode on the substrate is overlapped with orthogonal projections of the first electrodes, the second electrodes and the third electrodes on the substrate.

6. The touch sensing panel as claimed in claim 1, further comprising an insulating layer, wherein the first electrodes and the second electrodes are electrically insulated to each other through the insulating layer.

7. The touch sensing panel as claimed in claim 6, wherein the insulating layer comprises a plurality of island-shaped insulating patterns disposed at intersections of the first electrodes and the second electrodes, or the insulating layer is a continuous insulating thin film located between the first electrodes and the second electrodes.

8. The touch sensing panel as claimed in claim 1, wherein each of the first electrodes and each of the second electrodes are strip electrodes respectively.

9. The touch sensing panel as claimed in claim 1, wherein each of the first electrodes comprises a plurality of first electrode pads and a plurality of first connecting portions, each of the first connecting portions connects the two adjacent first electrode pads in series, each of the second electrodes comprises a plurality of second electrode pads and a plurality of second connecting portions, each of the second connecting portions connects the two adjacent second electrode pads in series.

10. A touch sensing control unit applied to the touch sensing panel as claimed in claim 1, comprising:
    a drive control unit, comprising:
    a contact driving unit configured for providing a contact driving signal to each of the contact driving electrodes; and
    a non-contact driving unit configured for providing a non-contact driving signal to the non-contact driving electrode; and
    a signal processing unit configured for receiving signals from the contact sensing electrodes and the non-contact sensing electrodes, to determine a touch sensing information of a target.

* * * * *